(12) United States Patent
Wooldridge et al.

(10) Patent No.: US 8,967,366 B2
(45) Date of Patent: Mar. 3, 2015

(54) SYSTEM AND METHOD FOR SINGULATING AND SEPARATING A PLURALITY OF NON-ORIENTED ITEMS

(71) Applicants: Donald Wooldridge, Dunkirk, MD (US); Mark Richard, Pasadena, MD (US)

(72) Inventors: Donald Wooldridge, Dunkirk, MD (US); Mark Richard, Pasadena, MD (US)

(73) Assignee: Batching Systems, Inc., Prince Frederick, MD (US)

( * ) Notice: Subject to any disclaimer, the term of this patent is extended or adjusted under 35 U.S.C. 154(b) by 39 days.

(21) Appl. No.: 13/893,407

(22) Filed: May 14, 2013

(65) Prior Publication Data

US 2014/0339048 A1    Nov. 20, 2014

(51) Int. Cl.
*B65G 47/26*    (2006.01)
*B65G 47/28*    (2006.01)
*B65G 21/20*    (2006.01)
*B65G 47/24*    (2006.01)

(52) U.S. Cl.
CPC ............ *B65G 47/28* (2013.01); *B65G 21/2072* (2013.01); *B65G 47/24* (2013.01)
USPC ............................ 198/453; 198/452; 198/443

(58) Field of Classification Search
USPC .......................... 198/443, 382, 383, 452, 453
See application file for complete search history.

(56) References Cited

U.S. PATENT DOCUMENTS

| | | | | | |
|---|---|---|---|---|---|
| 2,956,665 | A | * | 10/1960 | Arlin ............................ | 198/383 |
| 3,232,411 | A | * | 2/1966 | Kulig ........................... | 198/446 |
| 4,768,643 | A | * | 9/1988 | Lenhart ........................ | 198/453 |
| 4,889,224 | A | * | 12/1989 | Denker ......................... | 198/382 |
| 5,222,586 | A | * | 6/1993 | Ydoate et al. ................. | 198/452 |
| 5,788,053 | A | * | 8/1998 | Glawitsch .................... | 198/453 |
| 5,950,800 | A | * | 9/1999 | Terrell et al. ................. | 198/448 |
| 6,131,723 | A | * | 10/2000 | Schroader et al. ............ | 198/597 |
| 8,590,692 | B2 | * | 11/2013 | Wooldridge et al. ......... | 198/444 |

* cited by examiner

*Primary Examiner* — James R Bidwell
(74) *Attorney, Agent, or Firm* — John T. Whelan

(57) ABSTRACT

An aspect of the present invention provides a system for transferring a plurality of non-oriented items. The system includes a feeding area, a conveyor and a rail. The feeding area can accept the plurality of non-oriented items. The conveyor has a first end, a second end, a conveyor length disposed between the first end and the second end, a conveyor first side, a conveyor second side, a conveyor width disposed between the conveyor first side and the conveyor second side, and a conveyor ledge along the second side. The rail is disposed above the conveyor and from the conveyor ledge at a distance equal to one of the item height, the item width and the item length. A first portion of the plurality of non-oriented items will convey along the conveyor path. A second portion of the plurality of non-oriented items will fall off the conveyor ledge.

12 Claims, 7 Drawing Sheets

SYSTEM AND METHOD FOR SINGULATING AND SEPARATING A PLURALITY OF NON-ORIENTED ITEMS

BACKGROUND

The present invention generally pertains to systems and method for singulating a batch of non-oriented items. Conventionally, after manufacturing items in bulk, the bulk or batch of items may need to be counted and/or packaged. Typically, a batch of items is dumped into a loading bin of an item transfer system. The dumped items are distributed in random orders and positions within the loading bin, thus giving the term "non-oriented items". In order to efficiently count/package the non-oriented items, the item transfer system should singulate the non-oriented items, that is, place the items in single file order. An example conventional item transfer system will now be described with reference to FIGS. 1A-B.

FIGS. 1A-B are top views of a conventional item transfer system 100.

As shown in FIG. 1A, conventional item transfer system 100 includes a feeding area 102, a conveyor 104 and a detector 106. Feeding area 102 includes a loading bin 108 and a tapered chute 110. Conveyor 104 includes a side 112, a side 114, an end 116, an end 118, a rail 120, a rail 122 and a conveying surface 124.

Chute 110 is disposed between loading bin 108 and end 116. A batching bin 126 is disposed between end 118 and detector 106. Rail 120 is disposed above conveying surface 124 and a distance $d_1$ from side 112. Rail 122 is disposed above conveying surface 124 and a distance $d_2$ from side 114. Rail 122 is separated from rail 120 by a width $w_1$. Conveying surface 124 has a width $w_2$ between side 112 and side 114.

Feeding area 102 feeds a plurality of non-oriented items 128 to conveyor 104. Conveyor 104 conveys plurality of non-oriented items 128 from feeding area 102 to batching bin 126. Detector 106 detects plurality of non-oriented items 128 as disposed in batching bin 126.

In operation, plurality of non-oriented items 128 are dumped into loading bin 108. As loading bin 108 fills up, a portion of plurality of non-oriented items 128 slide/tumble/roll down tapered chute 110 onto conveying surface 124 of conveyor 104. For purposes of discussion, presume that conveyor 104 is a conveyor belt system operating so as to move conveying surface 124 in a direction from end 116 toward end 118 (as indicated by an arrow 139).

Once on conveying surface 124, an item will convey toward end 118 and then fall into batching bin 126. Batching bin 126 then holds deposited items 138. Detector 106 is positioned so as to count the items that fall offend 118 into batching bin 126.

Width $w_1$ between rail 120 and rail 122 permits only a single item to pass therebetween. For example, items 130, 132 and 134 each pass between rail 120 and rail 122 in a single file, i.e., they are singulated. In this manner, the non-oriented items may be singulated before they are deposited into batching bin 126. This singulation assists detector 106 to count the items.

In some cases, it may be useful to orient plurality of non-oriented items 128 before they are deposited into batching bin 126. For example, batching bin 126 may be able receive and stack items, provided the items are delivered in a predetermined manner. To orient plurality of non-oriented items 128 before they are deposited into batching bin 126, width $w_1$ between rail 120 and rail 122 may be adjusted. This will be described with reference to FIG. 1B.

FIG. 1B illustrates a state of conventional item transfer system 100 wherein rail 120 and rail 122 have been adjusted to reduce the space therebetween.

For purposes of discussion, presume that each of non-oriented items 128 has a width, height and length. Further, presume that as shown in FIG. 1B, width $w_1$ between rail 120 and rail 122 has been adjusted to the smaller of the width, height and length of on item. In this manner, each non-oriented item will not only be singulated as it conveys across conveyor 104, each non-oriented item should be oriented in a predetermined manner.

A problem with conventional item transfer system 100 is clogging or jamming. For example, as illustrated in FIG. 1B, a portion of plurality of non-oriented items 128 may be located in an area 144, the area before entry into the passageway bounded by rail 120 and rail 122. There is a likelihood that an item may be oriented such that it cannot fit between rail 120 and rail 122. In such case, the item may block the passage way bounded by rail 120 and rail 122, thus preventing other items from entering.

If item transfer system 100 becomes clogged/jammed with items, the clog must be cleared, for example manually by a user, before the system may continue to fill batching bin 126. Such clogs drastically reduce efficiency of item transfer system 100. Of course the shape of rails 120 and 122 may be designed to minimize clogging for a particular shape/size of item to be conveyed. However, if a batch of differently shaped/sized items is then used, then it is then more likely that the clogging will occur. Furthermore, as the speed of conveyor surface increases, the likelihood of item transfer system 100 becoming clogged/jammed increases.

Another problem with conventional item transfer system 100 is that the items may not be separated. For example, as illustrated in FIG. 1B, some non-oriented items 128 may be located in an area 144, the width between rails 120 and 122 is much smaller in order to more precisely singulate items 140, 142, 146, 148 and 150. However, nothing in conventional item transfer system 100 ensures separation of the items, that is, a space between successive items in the direction of arrow 139. In this example, items 146, 148 and 150 are not separated. As a result, detector 106 may incorrectly count the combination of items 146, 148 and 150 as a single item.

What is needed is a system and method that singulates, and separates, non-oriented items without clogging and that is item shape/size independent.

BRIEF SUMMARY

The present invention provides a system and method that singulates and separates non-oriented items without clogging and is item shape/size independent.

In accordance with an aspect of the present invention, a system is provided for transferring a plurality of non-oriented items, each item having an item height, an item width and an item length. The system includes a feeding area, a conveyor and a rail. The feeding area can accept the plurality of non-oriented items. The conveyor has a first end, a second end, a conveyor length disposed between the first end and the second end, a conveyor first side, a conveyor second side, a conveyor width disposed between the conveyor first side and the conveyor second side, and a conveyor ledge along the second side. The conveyor can move the plurality of non-oriented items in a direction along a conveyor path. The rail has a first rail end, a second rail end, a rail length disposed between the first rail end and the second rail end and a rail height. The rail is disposed above the conveyor and from the conveyor ledge at a distance equal to one of the item height, the item width and the item length. A first portion of the plurality of non-oriented items will convey along the conveyor path. A second portion of the plurality of non-oriented items will fall off the conveyor ledge.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

The present invention provides a system and method for transferring items, wherein a plurality of aspects greatly increase efficiency over that of conventional item transfer systems.

Figure 1A:
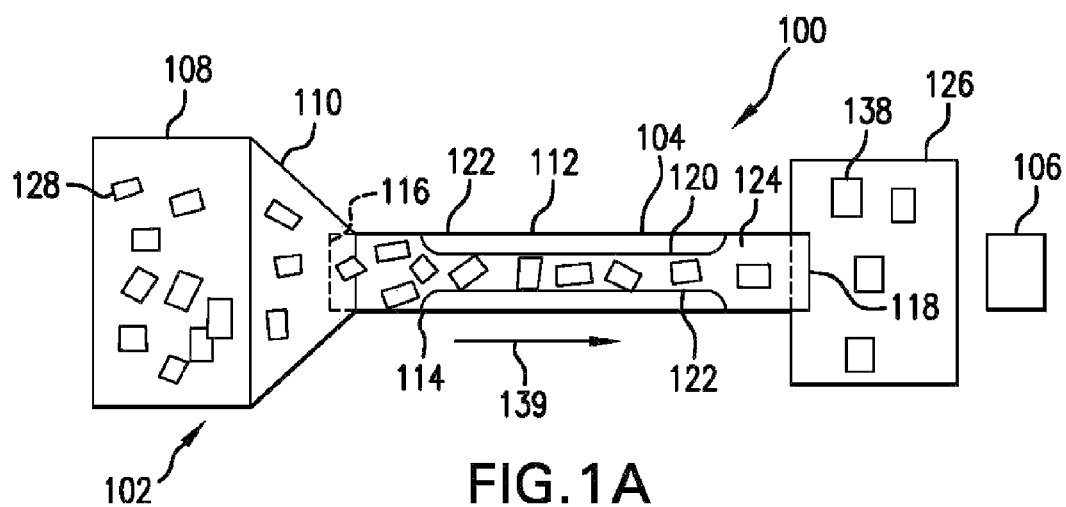
FIG. 1A is a top view of a conventional item transfer system.
Figure 1B:
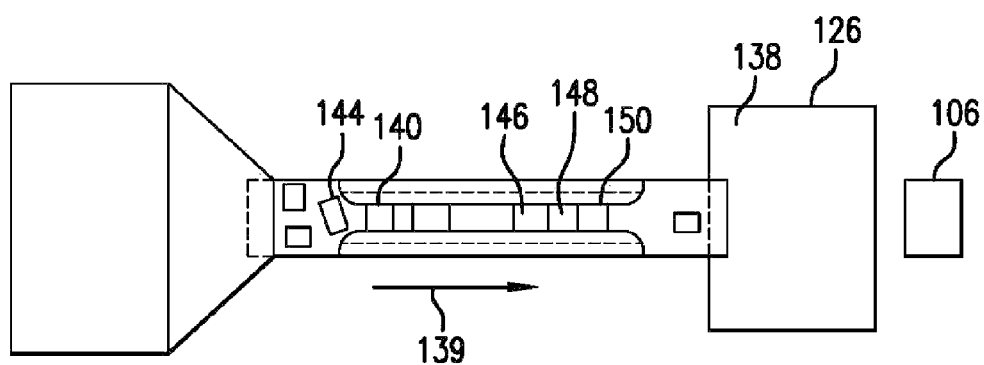
FIG. 1B is a top view of the conventional item transfer system of FIG. 1A, wherein the rails have been adjusted to a narrower width.

In one aspect of the present invention, a rail is used to singulate non-oriented items on a conveyor. Contrary to conventional item transfer system 100 discussed above with reference to FIG. 1, in accordance with the present invention, the conveyor has a rail on one side and a ledge on the other. The items that travel along the path bounded by the rail and the ledge will be transferred to the batching bin, whereas the other items will fall off the ledge. A second conveyor is disposed to catch those items that fall off the ledge. The second conveyor is arranged to re-circulate the fallen items back into the feeding area. Therefore, because there is no second rail the item transfer system will not clog or jam. As such, an item transfer system in accordance with the present invention will run much more efficiently than conventional item transfer system 100 discussed above with reference to FIG. 1.

In another aspect of the present invention, a conveyor is controlled to "stutter" in order to separate items. In an example embodiment, a conveyor will move forward a predetermined amount, then move backward a predetermined amount and then again move forward a predetermined amount, wherein the overall motion is in a forward direction. This forward-backward-forward stutter prompts longitudinal separation of any items that may be touching. As such, a counter used with item transfer system in accordance with the present invention will more easily distinguish separate items.

In another aspect of the present invention, the rail shape and location is controllable in order to accommodate differently sized items.

In another aspect of the present invention, a wiping arm prevents stacked items from traversing along a conveyor.

In another aspect of the present invention, a conveyor is rotatable about an axis so as to bias items against the rail. This aspect accounts for items that are able to roll.

In another aspect of the present invention, an item retaining arm, which is rotatable about an axis, is positioned adjacent to the ledge of the conveyor. This aspect also prevents stacked items from traversing along the conveyor.

In another aspect of the present invention, the location of an item detector may be adjusted based on the velocity of the items traversing the conveyor. As such, a counter used with item transfer system in accordance with the present invention may more easily distinguish items.

In accordance with a first aspect of the present invention, a conveyor system and method is able to quickly and easily singulate non-oriented items. This will be further described with reference to FIGS. 2-3.

Figure 2:
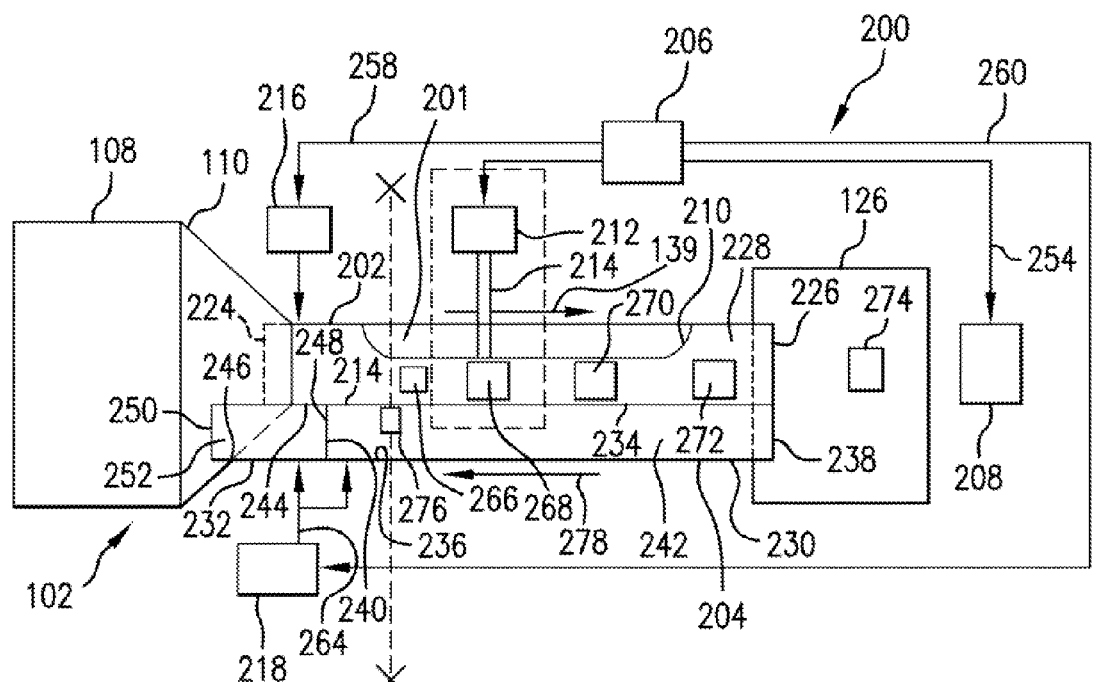
FIG. 2 is a top view of an example item transfer system in accordance with aspects of the present invention.

FIG. 2 is a top view of an example item transfer system 200, in accordance with aspects of the present invention.

As shown in FIG. 2, item transfer system 200 includes feeding area 102, a conveyor 202, a conveyor 204, a controller 206, a detector 208, a rail 210, a rail controller 212, an adjustment arm 214, conveyor controller 216 and a conveyor controller 218. Conveyor 202 includes a side 220, a ledge 222, an end 224, an end 226 and a conveying surface 228. Conveyor 204 includes a conveyor portion 230 and a conveyor portion 232. Conveyor portion 230 includes a side 234, a side 236, an end 238, an end 240 and a conveying surface 242. Conveyor portion 232 includes a side 244, a side 246, an end 248, an end 250 and a conveying surface 252.

Controller 206, detector 208, rail controller 212, conveyor controller 216 and conveyor controller 218 are illustrated as individual devices. However, in some embodiments, at least two of controller 206, detector 208, rail controller 212, conveyor controller 216 and conveyor controller 218 may be combined as a unitary device. Further, in some embodiments, at least one of controller 206, detector 208, rail controller 212, conveyor controller 216 and conveyor controller 218 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Chute 110 is disposed between loading bin 108 and end 224. Batching bin 126 is disposed between end 226 and detector 208. Rail 210 is disposed above conveying surface 228 and a distance, determined by rail controller 212, from side 112. Rail 210 is separated from side 222 by a width $w_1$. Conveying surface 228 has a width $w_2$ between side 220 and side 222.

Feeding area 102 feeds a plurality of non-oriented items 128 to conveyor 202.

Conveyor 202 conveys a first portion of plurality of non-oriented items 128 from feeding area 102 to batching bin 126. Conveyor 202 may be any system or device that is operable to move an item from feeding area 102 to batching bin 126. A non-limiting example embodiment of a conveyor includes a conveyor belt system.

Detector 208 detects the first portion of plurality of non-oriented items 128 as disposed in batching bin 126. Detector 208 may be any known type of detector that is operable to detect an item. A non-limiting example embodiment of a detector includes an optical detector.

Rail 210 guides the first portion of plurality of non-oriented items 128 from feeding area 102 to batching bin 126. Rail 210 may be any known structure that is operable to guide an item along a conveying path. In a non-limiting example embodiment, rail 210 includes a deformable material having sufficient structural integrity so as to prevent an item on conveyor 202 from traveling along an area 201 bounded by rail 210 and side 220. Rail 210 additionally causes a second portion of plurality of non-oriented items 128 to fall off ledge 222 onto conveyor portion 230. Specifically, an item's weight distribution is determined by its dimensions. When its center of gravity is hanging over the ledge, the item will topple off conveyor 202.

Conveyor portion 230 conveys the second portion of plurality of non-oriented items 128 to conveyor portion 232. Conveyor portion 230 may be any system or device that is operable to move an item that falls off ledge 222 to conveyor portion 232. A non-limiting example embodiment of a conveyor portion includes a conveyor belt system.

Conveyor portion 232 conveys the second portion of plurality of non-oriented items 128 (that is, the fallen items) from conveyor portion 230 back to feeding area 102. Conveyor portion 232 may be any system or device that is operable to move an item from conveyor portion 230 to feeding area 102. A non-limiting example embodiment of a conveyor portion includes a conveyor belt system.

Controller 206 controls detector 208, rail controller 212, conveyor controller 216 and conveyor controller 218. Controller 206 is in bi-directional communication with detector 208 via a detector control line 254. Controller 206 is in bi-directional communication with rail controller 212 via an adjustment control line 256. Controller 206 is in bi-directional communication with conveyor controller 216 via a conveyor control line 258. Controller 206 is in bi-directional communication with conveyor controller 216 via a conveyor control line 260.

Conveyor controller 216 drives conveyor 202. Conveyor controller 216 is in communication with conveyor 202 via a conveyor driver line 262.

Conveyor controller 218 drives conveyor portion 230 and conveyor portion 232. Conveyor controller 218 is in communication with conveyor portion 230 and conveyor portion 232 via a conveyor driver line 264.

Figure 3:
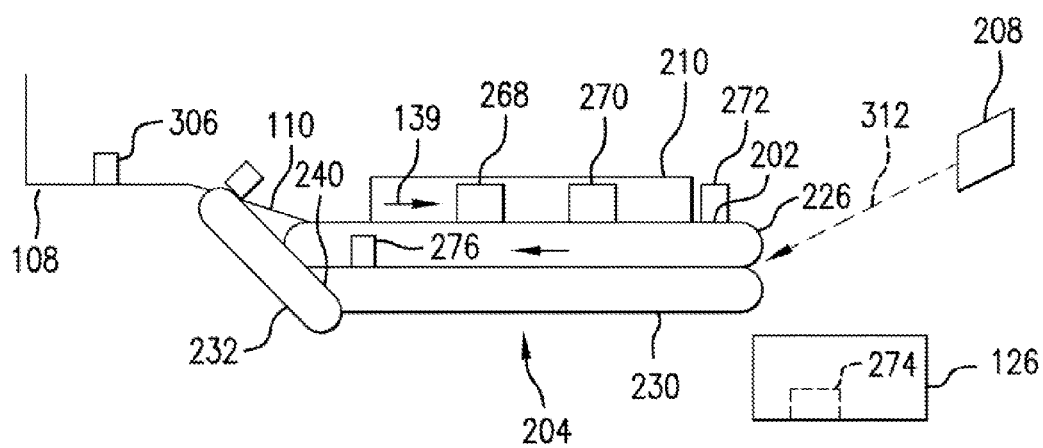
FIG. 3 is a side view of the item transfer system of FIG. 2.

FIG. 3 is a side view of item transfer system 200.

In operation, plurality of non-oriented items 128 are dumped into loading bin 108. When activated, a portion of plurality of non-oriented items 128 slide/tumble/roll down tapered chute 110 onto conveying surface 228 of conveyor 202. For purposes of discussion, presume that conveyor is a conveyor belt system operating so as to move conveying surface 228 in an overall direction from end 224 toward end 226 (as indicated by an arrow 139).

Once on conveying surface 228, an item will convey toward end 226 and then fall into batching bin 126. Batching bin 126 then holds deposited items 138. Detector 208 is positioned so as to count the items that fall offend 226 into batching bin 126.

Width $w_1$ between rail 210 and ledge 222 permits only a single item to pass therebetween. For example, for purposes of discussion, take the case where items 266, 268, 270 and 272 are disposed on conveyor surface 228. As conveyor surface moves in an overall direction from end 224 toward end 226, items 266, 268, 270 and 272 additionally move in an overall direction from end 224 toward end 226. Each of items 266, 268, 270 and 272 may ultimately rest on any particular position on conveyor surface 228 after sliding down chute 110 from loading bin 108. In any event, as each item approaches rail 210, rail 210 will force each item in a direction between rail 210 and ledge 122. As a result, items 266, 268, 270 and 272 form a single file, i.e., they are singulated, as they convey along conveyor 202. In this manner, the non-oriented items may be singulated before they are deposited into batching bin 126, for example as represented by item 274. This singulation assists detector 208 to count the items. In particular, as shown in FIG. 3, detector 208 is arranged to have a line of sight 312, with which to count items as they fall offend 226 of conveyor 202.

Returning to FIG. 2, rail 210 additionally forces some items to fall off ledge 222 and onto conveyor portion 230. For example, item 276 was either not oriented so as to fit between rail 210 and ledge 222 or was originally positioned next to one of items 266, 268, 270 and 272. As such, item 276 fell off ledge 222 and onto conveyor portion 230. Because item transfer system 200 includes a ledge on a conveyor as opposed to a second rail, similar to rail 122 of conventional item transfer system 100 discussed above with reference to FIGS. 1A-B, a plurality of non-oriented items will not clog or jam the system. Accordingly, item transfer system 200 can singulate non-oriented items more efficiently than conventional item transfer system 100 discussed above with reference to FIGS. 1A-B.

Conveyor portion 230 conveys in a direction from end 238 to end 240 as indicated by arrow 278. More easily seen with reference to FIG. 3, once item 276 falls off ledge 222 and onto conveyor portion 230, conveyor portion 230 will return item 276 to conveyor portion 232, which will then return item 276 to loading bin 108. In other words, conveyor 204, including conveyor portion 230 and conveyor portion 232, re-circulates any portion of the non-oriented items, which are not singulated by rail 210 and ledge 222, back to loading bin 108. Once back in loading bin 108, the re-circulated portion of the non-oriented items are again provided to conveyor surface 228 for singulation. The process continues until all the items are appropriately conveyed to batching bin 126.

In the above-discussed non-limiting example embodiment, conveyor 204 includes two conveyor belt systems (230 and 232) that convey fallen items back to loading bin 108. However, in other embodiments, conveyor 204 may be any system or mechanism that is operable to gather items that fall off ledge 222 and to convey the fallen items to back to a position on conveyor 202 prior to rail 210.

In accordance with the aspect of the present invention discussed above with reference to FIGS. 2-3, as a result of using a single rail in conjunction with a ledge, there is no chance of the non-oriented items clogging item transfer system 200. Accordingly, item transfer system 200 may be operated such that the velocity of conveyor surface 228 is much greater than the velocity of conveyor surface 124 of item transfer system 100 of FIG. 1.

In some cases, it also may be useful to longitudinally separate singulated items. As discussed above with reference to items 146, 148 and 150 of FIG. 1B, if items are not separated, even though they are singulated, a detector may not accurately distinguish separate items. This may introduce error in number of counted items.

In accordance with another aspect of the present invention, a conveyor system and method is able to separate items. In particular, a conveyor is driven with a stutter to promote longitudinal separation of any items that are not separated. For example, returning to FIG. 2, conveyor controller 216 may drive conveyor 202 by way of conveyor drive line 262: in a forward direction (from loading bin 108 toward batching bin 126) for a first predetermined amount of time; in a backward direction (from batching bin 126 toward loading bin 108) for a second predetermined amount of time; and then in a forward direction (from loading bin 108 toward batching bin 126) for a third predetermined amount of time, so long as the overall motion is in the forward direction. This will be further described with reference to FIGS. 4-6B.

Figure 4:
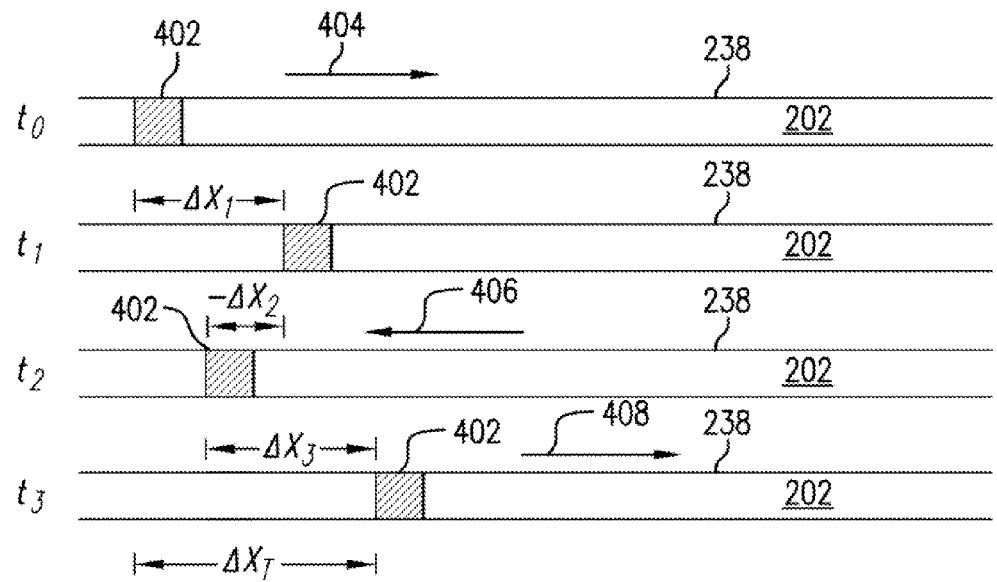
FIG. 4 is a timing chart of a portion of a conveyor of the item transfer system of FIG. 2 at times $t_0$, $t_1$, $t_2$ and $t_3$.

FIG. 4 is a timing chart of a portion of conveyor 202 at a times $t_0$, $t_1$, $t_2$ and $t_3$.

For purposes of explanation, at time $t_0$, conveyor 202 is positioned so as to have portion 402 at a reference position. Later at time $t_1$, surface 228 of conveyor 202 has moved in a direction, for example from end 224 toward end 226 (not shown), indicated by arrow 404 by a distance $\Delta x_1$.

At this time, conveyor 202 is driven in a reverse direction. At time $t_2$, surface 228 of conveyor 202 has moved in a reverse direction, for example from end 226 toward end 224 (not shown), indicated by arrow 406 by a distance $-\Delta x_2$. The change of direction will induce motion of items on surface 228 and promote separation of any items that are not already separated.

The overall goal is to convey items from loading bin 118 to batching bin 126. Accordingly, the overall motion must be in a direction from end 224 toward end 226. As such, at this time, conveyor 202 is again driven in the forward direction. At time $t_3$, surface 228 of conveyor 202 has moved in a forward direction, for example from end 224 toward end 226 (not shown), indicated by arrow 408 by a distance $\Delta x_3$. The change of direction will again induce motion of items on surface 228 and again promote separation of any items that are not already separated.

The total distance, $\Delta x_T$, that portion 402 will have traveled from time $t_0$ to time $t_3$ is calculated as:

$$\Delta x_T = \Delta x_1 - \Delta x_2 + \Delta x_3.$$

In some embodiments, $\Delta x_1 = \Delta x_3$, whereas in other embodiments $\Delta x_1 \neq \Delta x_3$. In some embodiments, $\Delta x_2 = 0$, wherein the motion of conveyor 202 may be described as forward-stop-forward. This type of stutter will still induce motion of items on surface 228 and again promote separation of any items that are not already separated.

So a velocity of surface 228 of conveyor 220 may be constantly changing, going forward or going backward, based on the stutter. However, an overall velocity of surface 228 of conveyor 220 is the total distance, $\Delta x_1$, that portion 402 traveled over the period defined by $t_3 - t_0$. This overall velocity is the average velocity of the singulated and separated items as they move from feeding area 102 to batching bin 126. Of course, some items may be recycled three or more times. However, only final displacement in the period matters.

The amount of stuttering may additionally be controlled by varying the velocity of conveyor 202 in both the forward and backward direction. The velocity may be determined by a drive signal provided by conveyor controller 216. In non-limiting example embodiments, a drive signal provided by conveyor controller 216 is a digital signal. Further, in a non-limiting example embodiment, the velocity is controlled by controlling a duty cycle of a drive signal provided by conveyor controller 216. This will now be described with reference to FIG. 5.

Figure 5:
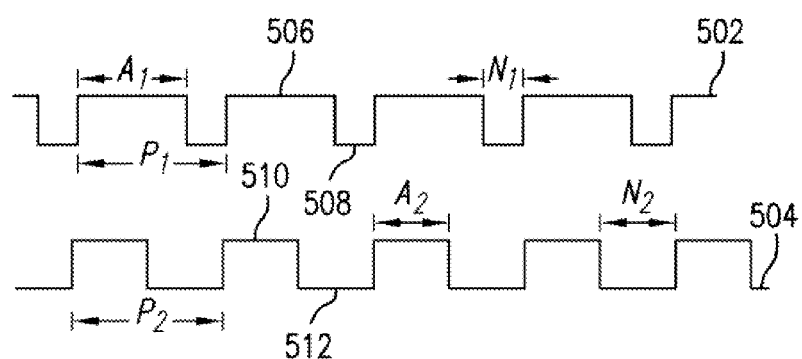
FIG. 5 illustrates example driving signals as provided by a conveyor controller to drive a conveyor in the item transfer system of FIG. 2.

FIG. 5 illustrates example driving signals 502 and 504 as provided by conveyor controller 216 to drive conveyor 202. In this example, driving signal 502 is used to move conveyor 202 in the direction indicated by arrow 404 of FIG. 4 (in the forward direction from end 224 toward end 226). Driving signal 504 is used to move conveyor 202 in the direction indicated by arrow 406 of FIG. 4 (in the reverse direction from end 226 toward end 224).

Driving signal 502 has a period $P_1$, wherein the active state 506 has a width $A_1$ and the non-active state 508 has a width $N_1$. Driving signal 504 has a period $P_2$, wherein the active state 510 has a width $A_2$ and the non-active state 512 has a width $N_2$. Because active state 506 of driving signal 502 is larger than driving state 510 of driving signal 504, driving signal 502 will drive conveyor 202 for a longer time than that of driving signal 504. Accordingly, returning to FIG. 4, driving signal 502 will "move" portion 402 a greater distance in the forward direction than driving signal 504 will "move" portion 402 in a reverse direction.

A pulse-width modulation scheme to control the stuttering of conveyor 202 is but one non-limiting example embodiment. Any known driving method may be used, non-limiting examples of which include pulse-number modulation and pulse-height modulation. In any event, the sudden change of velocity or stuttering of conveyor 202 promotes separation of items on conveyor surface 228. This will be described with reference to FIGS. 6A-B.

Figure 6A:
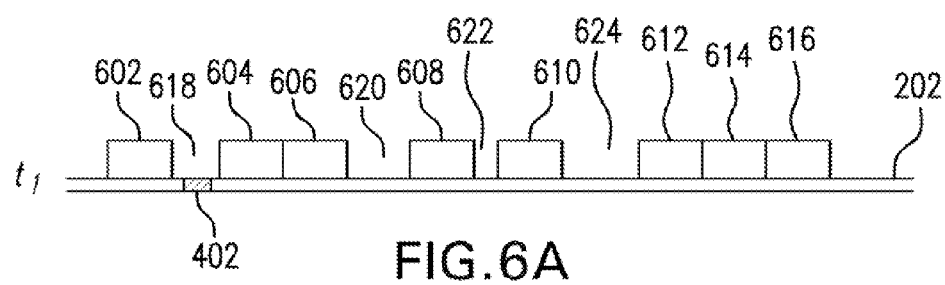
FIGS. 6A-B are side views of a portion of a conveyor of the item transfer system of FIG. 2 at a times $t_1$ and $t_3$, respectively.
Figure 6B:
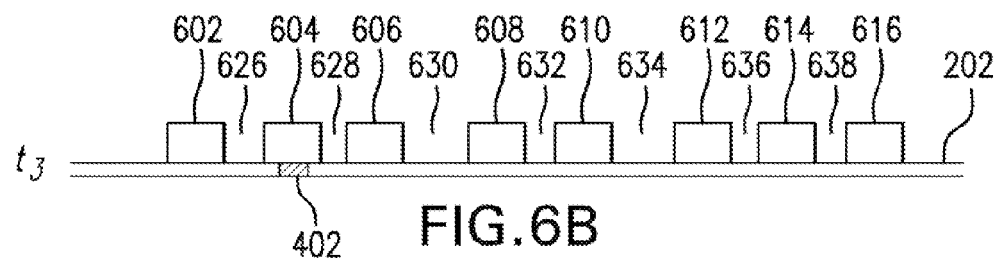

FIGS. 6A-B are side views of a portion of conveyor 202 at times $t_1$ and $t_3$, respectively.

For purposes of discussion, as shown in FIG. 6A, at time $t_1$, conveyor 202 has items 602, 604, 606, 608, 610, 612, 614 and 616 thereon. Item 602 is separated from item 604 by a spacing 618. Item 606 is separated from item 608 by a spacing 620. Item 608 is separated from item 610 by a spacing 622. Item 610 is separated from item 612 by a spacing 624. Item 604 is not separated from item 606. Similarly, item 614 is not separated from either item 612 or item 616.

Although items 602, 604, 606, 608, 610, 612, 614 and 616 may be singulated, non-separated items 604 and 606 and non-separated times 612, 614 and 616 may be inaccurately counted as single items by counter 208. By driving conveyor 202 with a stutter, as discussed above with reference to FIGS. 4 and 5, item 604 may be separated from item 606 and item 614 may be separated from items 612 and 616.

Recalling from the discussion above with reference to FIGS. 4 and 5, at time $t_3$, conveyor 202 will have been driven in a forward direction, in a reverse direction and then again in a forward direction. This stuttering promotes separation of items on conveyor surface 228. As shown in FIG. 6B, at time $t_3$, item 602 is separated from item 604 by a spacing 626. Item 604 is separated from item 606 by a spacing 628. Item 606 is separated from item 608 by a spacing 630. Item 608 is separated from item 610 by a spacing 623. Item 610 is separated from item 612 by a spacing 634. Item 612 is separated from item 614 by a spacing 636. Item 614 is separated from item 616 by a spacing 638.

Having all of items 602, 604, 606, 608, 610, 612, 614 and 616 separated, detector 208 may more accurately count the items.

In accordance with another aspect of the present invention, a conveyor system and method is able to accommodate differently sized non-oriented items. This will be further described with reference to FIG. 7.

Figure 7:
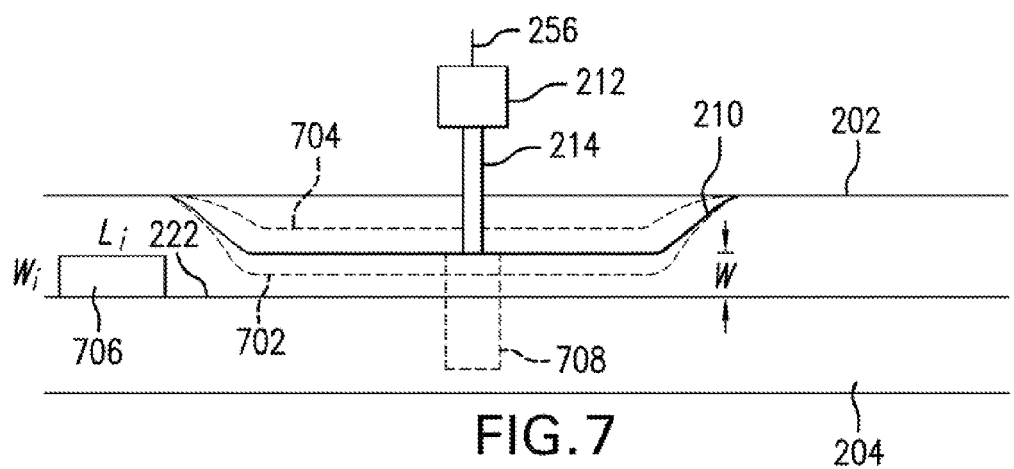
FIG. 7 is an exploded top view of a portion of the item transfer system of FIG. 2.

FIG. 7 is an exploded top view of area 203 of FIG. 2.

As shown in FIG. 7, an item 706 is being conveyed from loading bin 108 to batching bin 126. For purposes of discussion, presume that item 706 additionally has a length $l_i$, wherein $l_i > w_i$. In order to have items singulated into uniform arrangements, rail 210 is set at a distance from ledge 222, wherein the distance corresponds to the smaller of the dimensions of item 706. Accordingly, rail 210 is disposed distance $w_i$ from ledge 222. In this manner, if an item were to be situated in any position other than that similar to item 706, then the item will be forced off ledge 222. For example, if an item 708 were situated in a position such that its length were perpendicular to the length of item 706, then item 708 would be forced off ledge 222, onto conveyor 204 for re-circulation.

In the case where different items are to be transferred from loading bin 108 to batching bin 126, and the different items have different dimensions from item 706, then the position and shape of rail 210 may have to be changed. To accommodate such a change, rail controller 212 may extend or retract adjustment arm 214. For example, if the new items have a smaller dimension for sorting than item 706, rail controller 212 may extend adjustment arm 214. This would in turn change the position and shape of rail 210 as indicated by dotted line 702. Similarly, if the new items have a larger dimension for sorting than item 706, rail controller 212 may retract adjustment arm 214. This would in turn change the position and shape of rail 210 as indicated by dotted line 704.

Even if plurality of non-oriented items 128 become singulated, for example as described above with reference to FIG. 2, and separated, for example as described above with reference to FIGS. 4-6, there is a chance non-oriented items may stack on each other. In such a case, detector 208 may count two stacked items as a single item.

In accordance with another aspect of the present invention, a conveyor system and method is able to prevent stacking of non-oriented items. This will be further described with reference to FIGS. 8A-C.

Figure 8A:
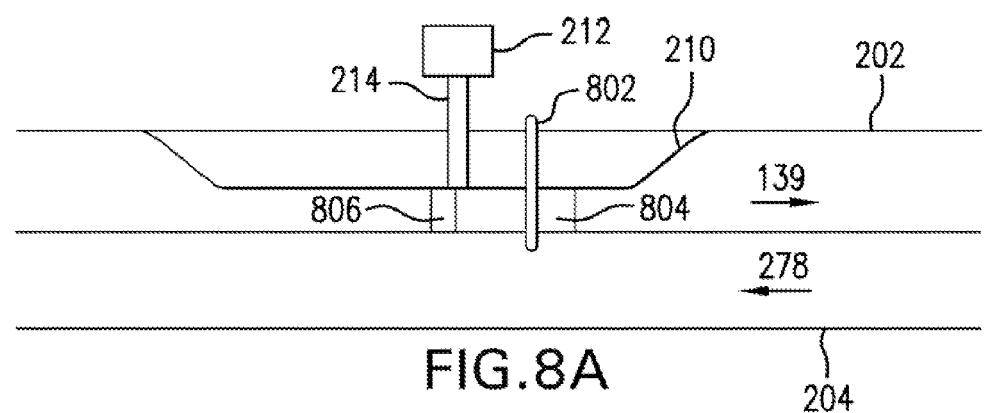
FIGS. 8A-C illustrate exploded views of a portion of the item transfer system of FIG. 2, with the addition of a wiping arm in accordance with an aspect of the present invention.
Figure 8B:
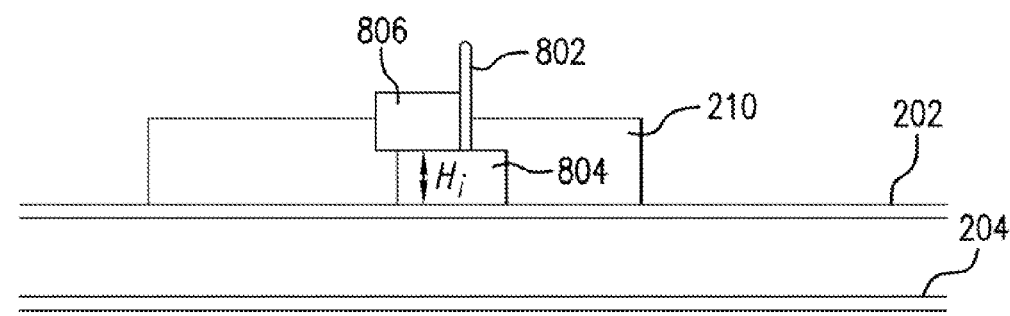
Figure 8C:
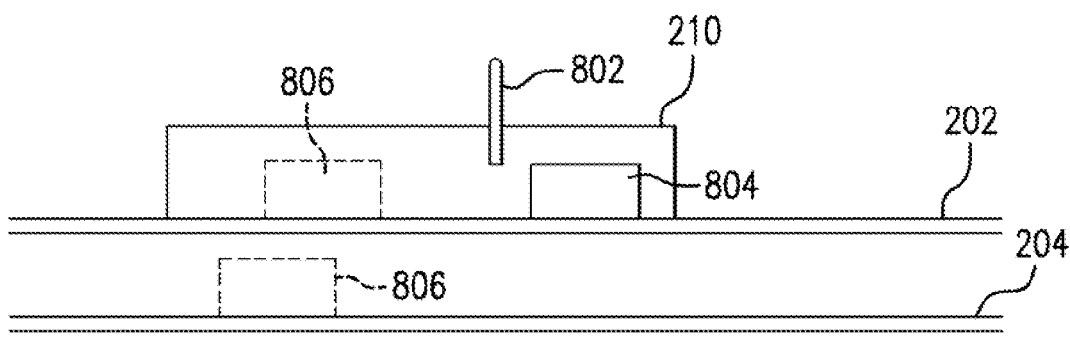

FIGS. 8A-C illustrate exploded views of area 203 of FIG. 2, with the addition of a wiping arm 802. FIG. 8A is a top view of area 203 at a time $T_1$. FIG. 8B is a side view of area 203 at time $T_1$. FIG. 8C is a side view of area 203 at time $T_2$.

As shown in FIG. 8A, wiping arm 802 is disposed to extend across conveyor 202 above rail 210. For purposes of discussion, presume that each item has an item height $H_i$. As shown in FIG. 5B, wiping arm 802 is disposed above conveyor surface 228 at a height to correspond with the height of the items to be singulated and separated. In this example, wiping arm 802 is disposed higher than height $H_i$ above conveyor surface 228 in order to permit a single item to pass. At time $T_1$, item 804 is disposed on conveyor 202 and an item 806 is stacked on item 804. At this point in time, item 804 passes under wiping arm 802, whereas item 806 is blocked by wiping arm.

Eventually, as conveyor 202 continues to transfer item 804 in direction 139, wiping arm 802 will wipe item 806 off the top of item 804.

As shown in FIG. 8C, at time $T_2$, item 806 has been wiped off item 804. Item 806 may fall onto conveyor 202 and continue in direction 139 or may fall onto conveyor 204 and be re-circulated.

There may be situations where items to be singulated and separated have a side that is not flat, which may induce instances of the items rolling off conveyor 202. Conveyor 202 may tilt in order to use gravity to bias such items toward rail 210.

In accordance with another aspect of the present invention, a conveyor system and method is able to tilt to accommodate non-oriented items that may roll. This will be further described with reference to FIGS. 9-10.

Figure 9:
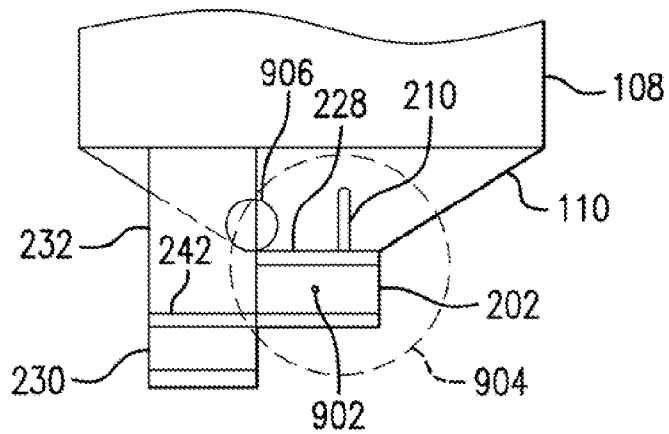
FIG. 9 is a cross sectional view of the item transfer system of FIG. 2 along line X-X.

FIG. 9 is a cross sectional view of item transfer system 200 along line X-X of FIG. 2.

As shown in FIG. 9, conveyor 202 and rail 210 are situated about an axis 902 such that conveying surface 228 is on a plane parallel with or substantially parallel with a plane of conveying surface 242 of conveying portion 230.

For purposes of discussion, presume that items to be transferred on item transfer system 200 have a circular cross section, such as ears of corn. There is a chance that item 906 may roll off conveyor 202 and onto conveyor portion 230. Although item 906 would eventually re-circulate and return to conveyor 202, this decreases the efficiency of operation of item transfer system 200.

To prevent item 906 from rolling off conveyor 202 and onto conveyor portion 230, conveyor 202 may be tilted about axis 902 in order to bias item 906 against rail 210. This will be described with reference to FIG. 10.

Figure 10:
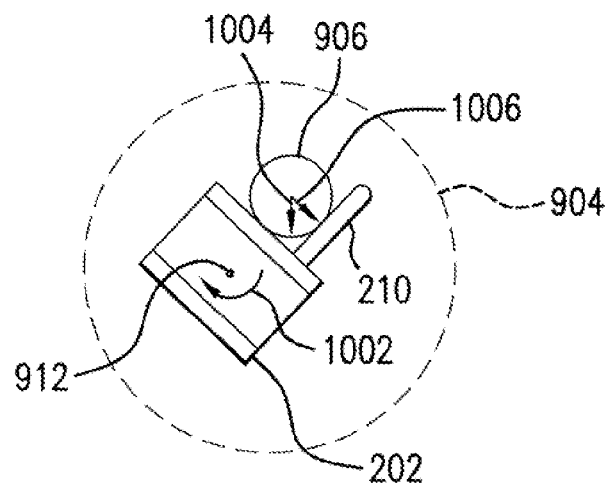
FIG. 10 is a cross sectional view of a portion of FIG. 9.

FIG. 10 is a cross sectional view of portion 904 of FIG. 9, which includes conveyor 202 and rail 210. In FIG. 10, conveyor 202 and rail 210 are tilted about axis 902 in a direction indicated by arrow 1002.

Gravity biases item 906 in a direction indicated by arrow 1004. A component of gravity will bias item 906 against rail 210 as indicated by arrow 1006. This component of gravity bias prevents items 906 from rolling off conveyor 202. In other words, the tilt shifts a center of gravity of rectilinear items, which otherwise might have fallen over ledge 222.

In some embodiments, conveyor 202 may be rotated manually. In other embodiments, conveyor 202 may be rotated by conveyor controller 216, as instructed by controller 206.

There may be instances where stacked items are forced off conveyor 202 without the need for a wiping arm, such as wiping arm 802 discussed above with reference to FIG. 8.

In accordance with another aspect of the present invention, a conveyor system and method is able to tilt to prevent stacking of non-oriented items. This will be further described with reference to FIGS. 11-12.

Figure 11:
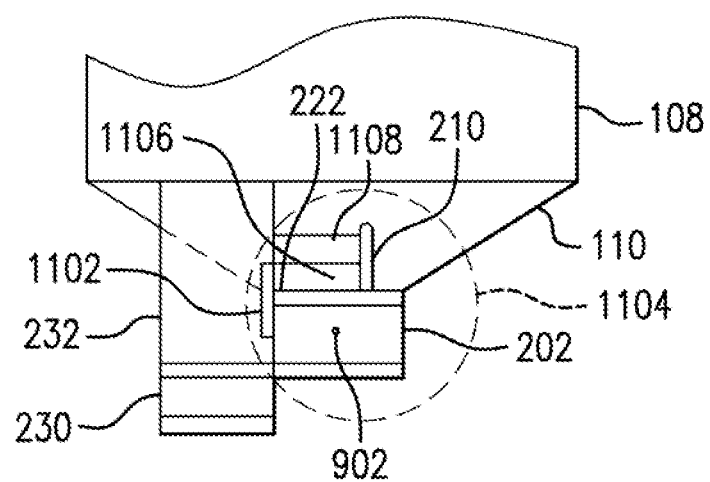
FIG. 11 is a cross sectional view of a modified embodiment of item transfer system of FIG. 2 along line X-X.

FIG. 11 is a cross sectional view of a modified embodiment of item transfer system 200 along line X-X of FIG. 2.

As shown in FIG. 11, conveyor 202 and rail 210 are situated about an axis 902 such that conveying surface 228 is on a plane parallel with or substantially parallel with a plane of conveying surface 242 of conveying portion 230. Further, an item retaining arm 1102 may be disposed adjacent to ledge 222.

For purposes of discussion, presume that items to be transferred on item transfer system 200 have a propensity to stack, such as washers. There is a chance that item 1106 may have a second item 1108 stacked thereon.

To remove item 1108 from item 1106, conveyor 202 may be rotated about axis 902 in order to slide item 1108 off item 1106 and onto conveyor portion 230. This will be described with reference to FIG. 12.

Figure 12:
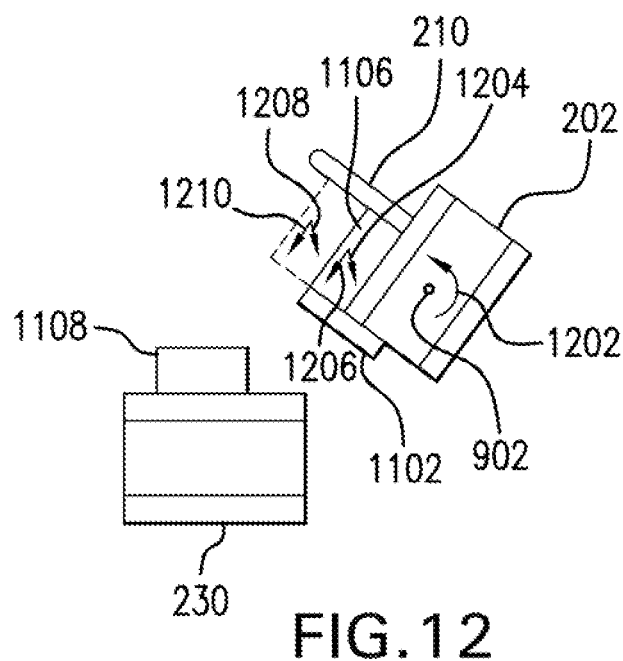
FIG. 12 is a cross sectional view of a portion of FIG. 11.

FIG. 12 is a cross sectional view of portion 1104 of FIG. 11, which includes conveyor 202 and rail 210. In FIG. 12, conveyor 202 and rail 210 are rotated about axis 902 in a direction indicated by arrow 1202.

Gravity biases item 1106 in a direction indicated by arrow 1204. A component of gravity will bias item 1106 against retaining arm 1102 as indicated by arrow 1206. Similarly, gravity biases item 1108 in a direction indicated by arrow 1208. A component of gravity will bias item 1108 toward conveyor portion 230 as indicated by arrow 1210. This component of gravity forces item 1108 to fall onto conveyor portion 230.

In some embodiments, retaining arm 1102 is fixed to a single position (height) at ledge 222. In other embodiments, the height of retaining arm 1104 may be adjusted at ledge 222 to accommodate a range of item heights.

The aspects discussed above with respect to FIGS. 2-12 address singulating and separating items. However, depending on conveyor 202 speed, detector 208 may have trouble distinguishing distinct between items as items are deposited in batching bin 126.

In accordance with another aspect of the present invention, a conveyor system and method is able to adjust a detector position based on the velocity of the items leaving the conveyor. This will be further described with reference to FIGS. 13A-C.

Figure 13A:
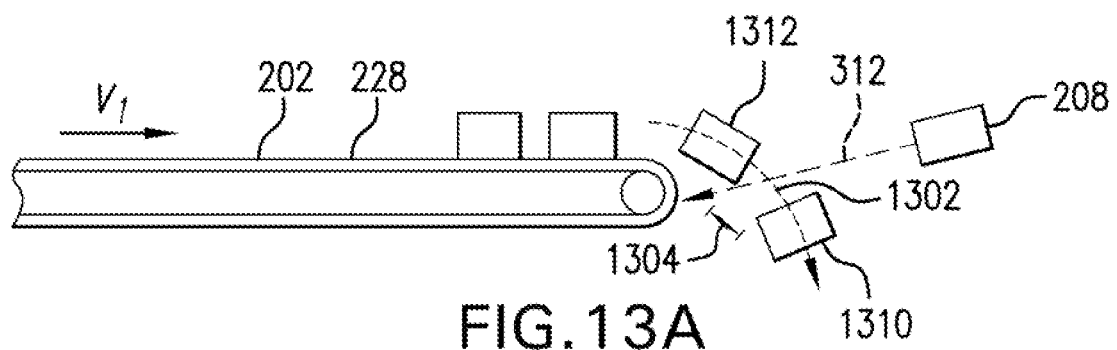
FIG. 13A is a side view of a portion of the item transfer system of FIG. 2 conveying items at an overall velocity $v_1$ and the detector being positioned so as to have line of sight.

FIG. 13A is a side view of conveyor 202 conveying items at an overall velocity $v_1$ and detector 208 positioned so as to have line of sight 312.

As shown in the figure, items will have a trajectory following dotted arrow 1302. So long as a spacing 1304 between items is sufficient, detector 208 distinguishes between items. However, when the overall velocity of the conveyed items increases, the trajectory of the items as they leave conveyor 202 changes.

Figure 13B:
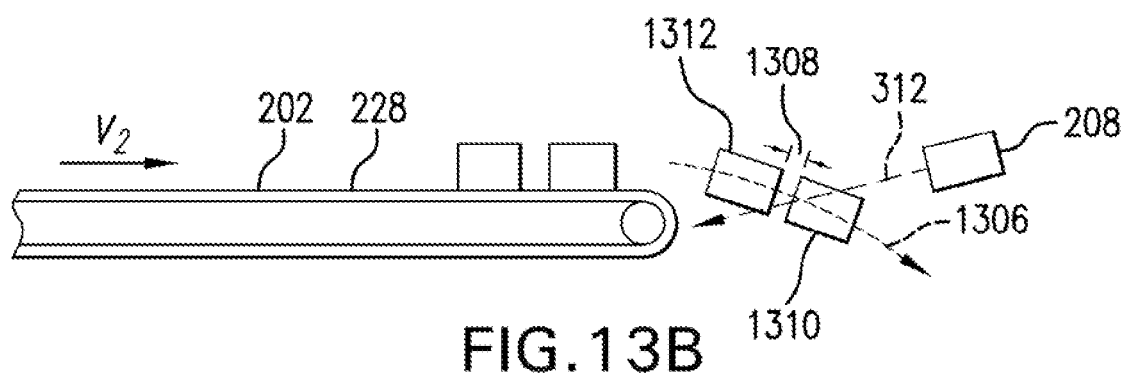
FIG. 13B is a side view of a portion of the item transfer system of FIG. 2 conveying items at an overall velocity $v_2$ and the detector being positioned so as to have line the sight similar to FIG. 13A.

FIG. 13B is a side view of conveyor 202 conveying items at an overall velocity $v_2$ and detector 208 positioned so as to have line of sight 312. As shown in the figure, items will have a trajectory following dotted arrow 1306. In this case, $v_2 > v_1$ such that dotted arrow 1306 has a smaller vertical gradient than that of dotted arrow 1302 of FIG. 13A.

The trajectory of items as shown in FIG. 13B are such that there is likelihood that detector 208 will not be able to distinguish distinct items. In the illustrated example, a distance 1308 separates items 1310 and 1312. As shown, in FIG. 13B, line of sight 312 intercepts item 1310 and 1312 because distance 1308 and the trajectory of items 1310 and 1312 (as shown by arrow 1306) are such that detector 208 cannot distinguish between items 1310 and 1312.

Figure 13C:
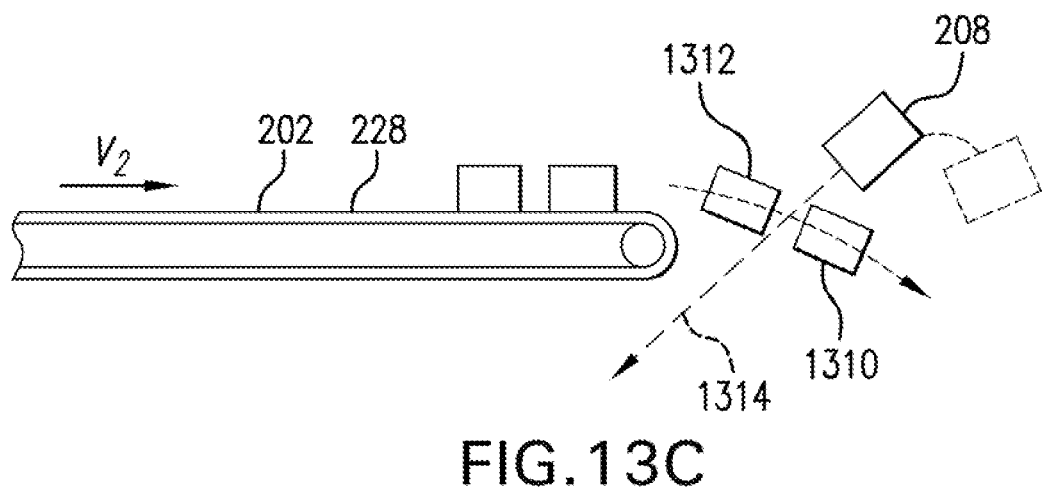
FIG. 13C is a side view of a portion of the item transfer system of FIG. 2 conveying items at an overall velocity $v_2$ and the detector being positioned so as to have a new line of sight.

FIG. 13C is a side view of conveyor 202 conveying items at an overall velocity $v_2$ and detector 208 positioned so as to have a line of sight 1314. Because detector 208 has moved to a new position, new line of sight 1314 enables detector to distinguish item 1310 from item 1312.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A system for transferring a plurality of non-oriented items, each item having an item height, an item width and an item length, said system comprising:
   a feeding area operable to accept the plurality of non-oriented items;
   a conveyor having a first end, a second end, a conveyor length disposed between said first end and said second end, a conveyor first side, a conveyor second side, a conveyor width disposed between said conveyor first side and said conveyor second side, and a conveyor ledge along said second side, said conveyor being operable to move the plurality of non-oriented items in a direction along a conveyor path;
   a rail having a first rail end, a second rail end, a rail length disposed between said first rail end and said second rail end and a rail height, said rail being; disposed above said conveyor, said rail being disposed from said conveyor ledge at a distance, the distance being equal to or greater than one of the item height, the item width and the item length, and the distance additionally being less than two times the one of the item height, the item width and the item length; and
   wherein during operation of the system a first portion of the plurality of non-oriented items will convey along the conveyor path, and
   wherein during operation of the system a second portion of the plurality of non-oriented items will fall off said conveyor ledge.

2. The system of claim 1, further comprising:
   a rail controller;
   wherein said rail is deformable, and
   wherein said rail controller is operable to adjust at least one of a position and shape of said rail.

3. The system of claim 1, wherein said conveyor is operable to tilt about an axis.

4. The system of claim 3, wherein said conveyor is operable to tilt to a first position about the axis such that gravity biases the non-oriented items against said rail.

5. The system of claim 1, further comprising a return conveyor system operable to move the second portion of the plurality of non-oriented items to said feeding area.

6. The system of claim 1, further comprising a wiper disposed above said conveyer at a second distance equal to or greater than one of the item height, the item width and the item length so as to prevent more than one of the plurality of non-oriented items to pass by said wiper along said conveyor at one time.

7. A method of transferring a plurality of non-oriented items, each item having an item height, an item width and an item length, said method comprising:

accepting, via a feeding area, the plurality of non-oriented items;

moving, via a conveyor having a first end, a second end, a conveyor length disposed between the conveyor first and the conveyor second end, a conveyor first side, a conveyor second side, a conveyor width disposed between the conveyor first side and the conveyor second side, and a conveyor ledge along the second side, the plurality of non-oriented items in a direction along a conveyor path; and disposing a rail above the conveyor and from the conveyor ledge at a distance, the distance being equal to or greater than one of the item height, the item width and the item length, and the distance additionally being less than two times the one of the item height, the item width and the item length, the rail having a first rail end, a second rail end, a rail length disposed between the first rail end and the second rail end and a rail height;

wherein a first portion of the plurality of non-oriented items will convey along the conveyor path, and wherein a second portion of the plurality of non-oriented items will fall off the conveyor ledge.

8. The method of claim 7, further comprising:
adjusting, via a rail controller, the rail,
wherein the rail is deformable, and
wherein said adjusting, a rail controller, the rail comprises adjusting least one of a position and shape of the rail.

9. The method of claim 7, further comprising tilting the conveyor about an axis.

10. The method of claim 9, wherein said tilting the conveyor about an axis comprises tilting the conveyor to a first position about the axis such that gravity biases the non-oriented items against the rail.

11. The method of claim 7, further comprising moving, via a return conveyor system, the second portion of the plurality of non-oriented items to the feeding area.

12. The method of claim 7, further comprising disposing a wiper above the conveyer at a second distance equal to or greater than one of the item height, the item width and the item length so as to prevent more than one of the plurality anon-oriented items to pass by the wiper along the conveyer at one time.

* * * * *